US012749256B2

(12) United States Patent
Barczak et al.

(10) Patent No.: US 12,749,256 B2
(45) Date of Patent: Sep. 29, 2026

(54) DENSE GEOMETRY FORMAT

(71) Applicant: Advanced Micro Devices, Inc., Santa Clara, CA (US)

(72) Inventors: Joshua David Barczak, Forest Hill, MD (US); Mohammed Ahmed Muneam Al-Obaidi, St. Albans (GB); David Kirk McAllister, Holladay, UT (US); Trevor James Hedstrom, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 36 days.

(21) Appl. No.: 18/742,788

(22) Filed: Jun. 13, 2024

(65) Prior Publication Data

US 2025/0131639 A1 Apr. 24, 2025

Related U.S. Application Data

(60) Provisional application No. 63/591,964, filed on Oct. 20, 2023.

(51) Int. Cl.

| | |
|---|---|
| ***G06T 15/06*** | (2011.01) |
| ***G06T 17/10*** | (2006.01) |
| ***G06T 17/20*** | (2006.01) |

(52) U.S. Cl.

CPC .............. *G06T 15/06* (2013.01); *G06T 17/10* (2013.01); *G06T 17/20* (2013.01)

(58) Field of Classification Search

CPC ......... G06T 15/06; G06T 17/10; G06T 17/20; G06T 9/001; G06T 1/20; G06T 15/08; G06T 3/4007; G06T 9/00; G06T 15/005; G06T 2210/12; G06F 9/5016; G06N 20/00

See application file for complete search history.

(56) References Cited

U.S. PATENT DOCUMENTS

| | | | | |
|---|---|---|---|---|
| 2003/0142100 | A1 | 7/2003 | Lavelle et al. | |
| 2019/0035147 | A1* | 1/2019 | Hazel | G06T 17/005 |
| 2022/0051466 | A1* | 2/2022 | Doyle | G06T 1/20 |
| 2025/0200814 | A1* | 6/2025 | Kim | H04N 19/20 |

FOREIGN PATENT DOCUMENTS

| | | |
|---|---|---|
| EP | 0957451 A2 | 11/1999 |

OTHER PUBLICATIONS

International Search Report and Written Opinion for International Application No. PCT/US2024/034144, issued Sep. 19, 2024, 13 pp.

* cited by examiner

*Primary Examiner* — Nelson M Rosario

(74) *Attorney, Agent, or Firm* — Kowert, Hood, Munyon, Rankin & Goetzel, P.C.; Rory D. Rankin

(57) ABSTRACT

Systems and methods described herein for storing primitive data for ray tracing and/or rasterization. The data is encoded efficiently into arrays of fixed-size data blocks using a data format which can be directly consumed for ray traversal or rasterization. Vertex data in a block is pre-quantized and stored using a fixed-bit quantization grid. Mesh connectivity is encoded using a triangle strips based on control values representing triangle interconnectivity, and a compressed index buffer storing indices for vertices in each strip. Further, triangle identifiers are derived from the triangle's position in the strip. The block can further store geometry identifiers and opacity maps corresponding to primitive data.

20 Claims, 8 Drawing Sheets

302

304

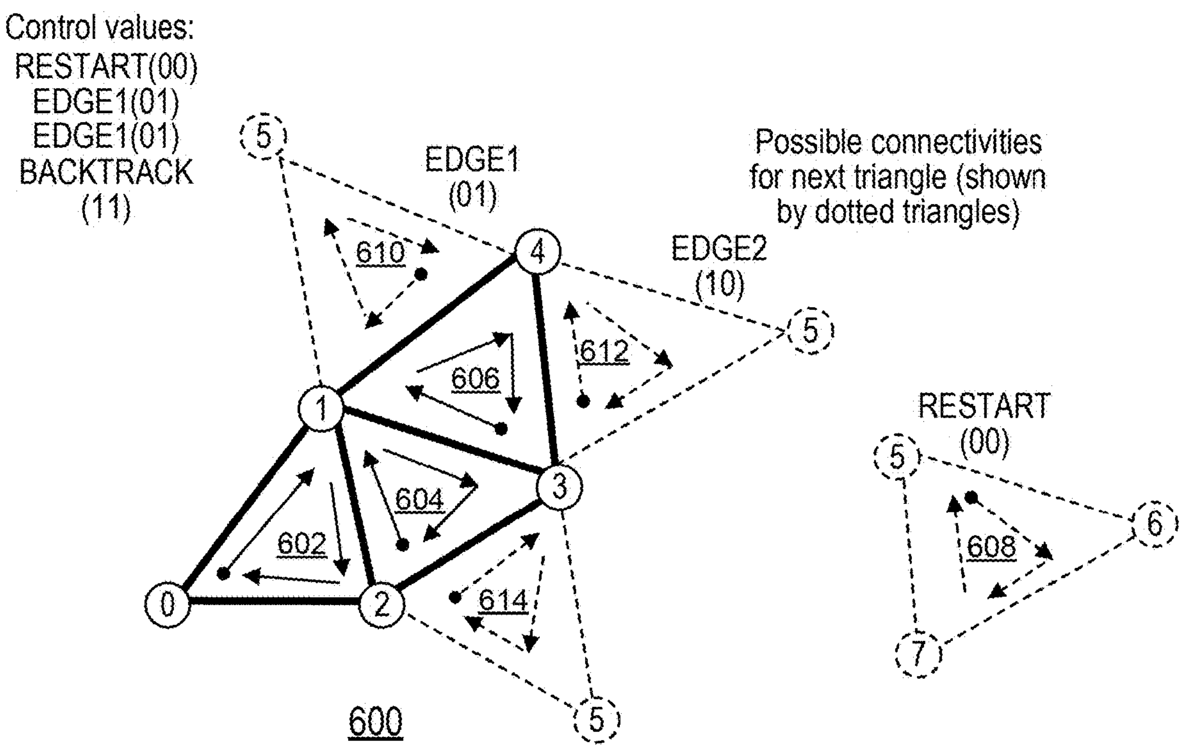

650

| Control Value | Value | Meaning |
|---|---|---|
| RESTART | 0 | Start a new strip, specifying 3 vertex indices for the triangle. |
| EDGE1 | 1 | The second edge of the predecessor triangle is reused as the first edge. |
| EDGE2 | 2 | The third edge of the predecessor triangle is reused as the first edge. |
| BACKTRACK | 3 | The opposite edge of the predecessor's predecessor is reused. 'Opposite edge' means EDGE1 if the predecessor used EDGE2, or EDGE2 if the predecessor used EDGE1. BACKTRACK is not allowed unless the predecessor used EDGE1 or EDGE2. A BACKTRACK triangle may not occur after a RESTART or another BACKTRACK. |

FIG. 6

Triangle Control Values
and Vertex orders:

RESTART(0,1,2)
EDGE1(2,1,3)
EDGE1(3,1,4)
EDGE2(3,4,5)
EDGE2(3,5,6)
EDGE2(3,6,2)
EDGE1(2,6,7)
EDGE2(2,7,8)
EDGE2(2,8,4)

| |
|---|
| Index Buffer 760: 0,1,2,3,4,5,,6,2,7,8,0 |
| Is-First Array 762: 11111110110 |
| Non-first Array 764: 2,0 |

DENSE GEOMETRY FORMAT

CROSS REFERENCE TO RELATED APPLICATIONS

This application claims priority to Provisional Patent Application Ser. No. 63/591,964, entitled "Dense Geometry Format" filed Oct. 20, 2023, the entirety of which is incorporated herein by reference.

BACKGROUND

Description of the Related Art

Ray tracing involves simulating how light moves through a scene using a physically-based rendering approach. Although it has been extensively used in cinematic rendering, it was previously deemed too demanding for real-time applications until recently. A critical aspect of ray tracing is the computation of visibility for ray-scene intersections, achieved through a process called "ray traversal." This involves calculating intersections between rays and scene objects by navigating through and intersecting nodes organized in a bounding volume hierarchy (BVH).

Standard methods for performing ray tracing or rasterization operations usually involve executing a graphics processing pipeline consisting of a series of stages dedicated to graphics operations. For instance, during each stage of this pipeline, a GPU can carry out various graphics-oriented processing tasks. At one stage, the GPU might gather a collection of geometrical primitives that depict a graphics scene, and in a subsequent stage, it could execute shading operations using the vertices linked to those primitives. Ultimately, the GPU would convert these vertices into pixels through a process known as rasterization, thereby rendering the graphics scene.

For every graphics primitive or geometry object created, a geometry shader produces vertex information for each vertex linked to that graphics primitive or geometry object. For instance, when handling a triangle, the geometry shading unit will provide vertex information for each of the triangle's three vertices. This vertex data might include details like the vertex's position within the scene, coverage data related to the vertex, or a collection of attributes linked to the vertex, among other specifics. As the geometry shader generates graphics primitives or geometry objects, it typically organizes each generated graphics primitive or each primitive forming part or all of a generated geometry object as a set of vertices associated with that primitive, along with the corresponding vertex data for each vertex within that set.

However, in various scenarios, the geometry shader often retains multiple redundant copies of vertex data linked to vertices shared among graphics primitives or geometry objects. This practice becomes problematic due to the potentially large number of shared vertices present in a typical graphics scene, which could number in the millions. As a result, a conventional geometry shader might end up storing millions of duplicate data copies. Handling such redundant data consumes computational resources inefficiently and can impede the rendering speed of a graphics scene.

Traditional methods employed for compressing geometry data can impose significant constraints on ray tracing or rasterization applications. These methods may include compressing data using lossy compression, without providing any fine-grained control over content-authoring. The traditional methods may also involve generating a fixed mesh topology, thereby resulting in limited flexibility and inefficient memory management. Furthermore, these methods usually involve expensive and complex pre-processing of data before this data can be used for rendering purposes.

In view of the above, improved systems and methods for compression of primitive data are needed.

BRIEF DESCRIPTION OF THE DRAWINGS

The advantages of the methods and mechanisms described herein may be better understood by referring to the following description in conjunction with the accompanying drawings, in which:

FIG. 6 illustrates a triangle strip used for encoding mesh topology data.

DETAILED DESCRIPTION OF IMPLEMENTATIONS

Figure 1:
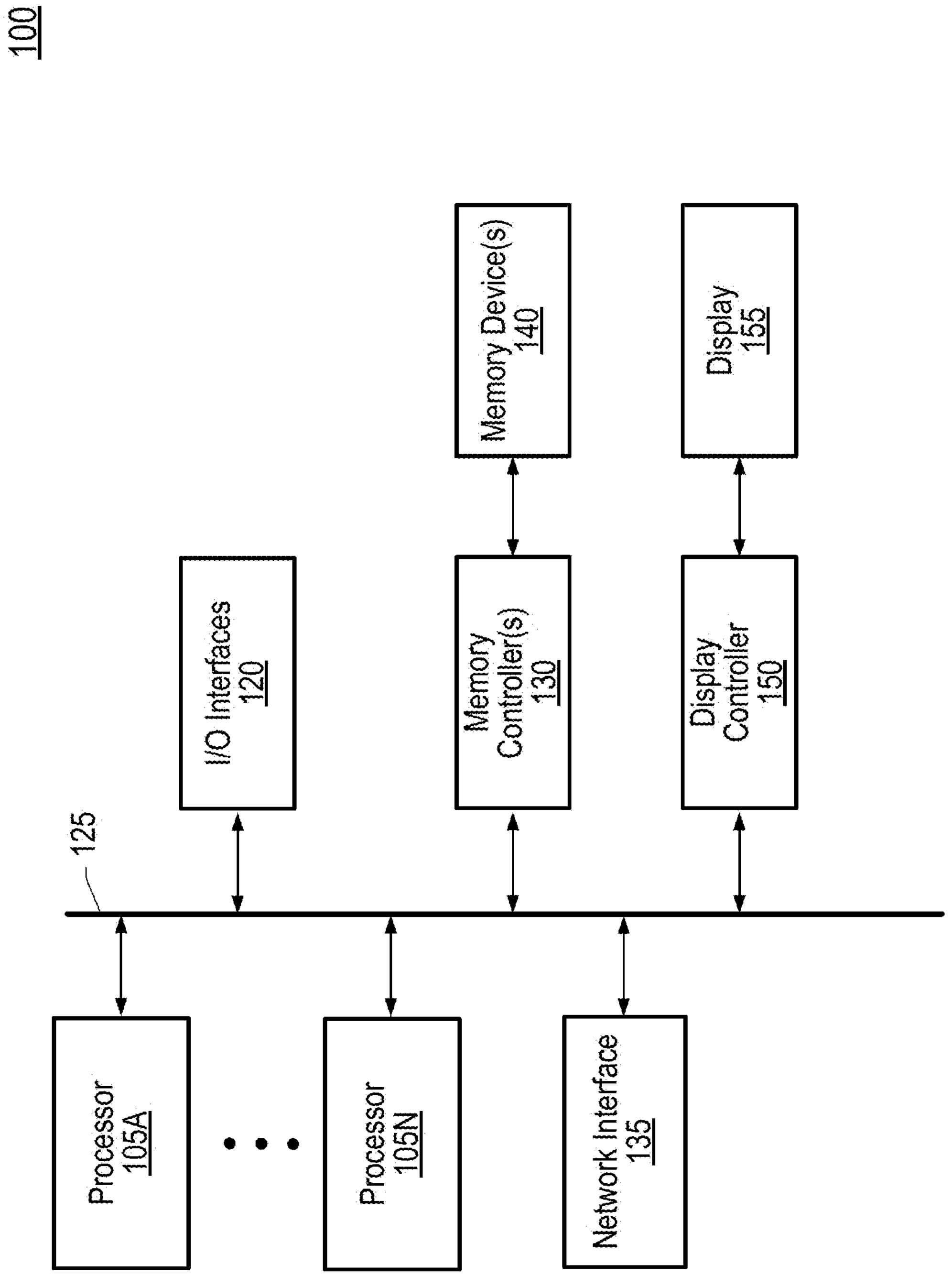
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for encoding geometrical primitives efficiently into data blocks are disclosed herein. In an implementation, these blocks can be directly consumed by processing circuitry (e.g., GPU) for ray traversal or rasterization. To create the data blocks, vertex data is encoded using a signed fixed-point grid. As described herein, "a fixed-point grid" is taken to mean a representation of triangle vertices and other geometric entities using fixed-point coordinates rather than floating-point values. The fixed-point grid, in one implementation, can be used due to their lower memory requirements and faster processing speed. A signed fixed-point grid divides a coordinate space (e.g., 2D plane or 3D space) into a grid of fixed-size cells or bins. Each vertex of a triangle is quantized by mapping its floating-point position to a grid cell within the fixed-point coordinate space. The floating-point position is multiplied by a scaling factor (e.g., power of two scaling factor) to convert it into a fixed-point value. For each vertex of a triangle (or other geometric primitive), its position is quantized to a grid cell using the fixed-point representation. The quantized grid cell serves as an approximation of the original floating-point position. In an implementation, data pertaining to quantization of vertices includes a 24 bit signed base position in the grid. A variable-width (e.g., 1-16 bits) unsigned offset for each vertex (relative to the base position) is also stored. Finally, a power-of-2 scale factor, used to map the quantization grid to floating-point coordinates for each triangle vertex, is stored as an "IEEE biased exponent."

In one implementation, encoded vertex data and other triangle data is stored as part of primitive mesh(es) data. The primitive mesh data includes a set of vertices, where each vertex is defined by its position (e.g., in a three-dimensional space) and additional attributes like normal vector data, texture coordinates, or colors. The mesh is composed of primitives, where each primitive is defined by indices pointing to the vertex data. For example, triangle meshes are often stored using optimized data structures like bounding volume hierarchies (BVHs) or k-dimensional trees (KD-trees). These structures organize the triangles spatially to accelerate ray-triangle intersection tests.

In one implementation, mesh connectivity data is encoded using primitive strips (e.g., triangle strips), and an index buffer. Primitive strips are used to describe and render a continuous surface or object composed of primitives. As described herein, in a primitive strip, each primitive shares an edge with the previous primitive in the sequence. This shared edge is formed by two consecutive vertices in the vertex list. In one implementation, by sharing vertices between adjacent primitives, primitive strips require fewer vertex data compared to individual primitive data, which reduces memory consumption and improves rendering performance.

In one or more implementations, the index buffer includes a fixed number of control values for primitives in the primitive strip. Each control value is indicative of the primitive's position relative to previously identified triangles in the strip. In an implementation, the length (or size) of the index buffer is determined based on the contents of the control values. The index buffer includes a set of bits, wherein each bit corresponds to an index of a given vertex of a primitive. The index buffer is organized into two parts. The first parts includes an array of bits, storing one bit per vertex indicative of whether a first index to a given vertex is encountered (hereinafter "first index"). The second part includes 'N' bits per index to store each non-first index to a vertex (hereinafter "non-first index"), wherein the value of N is predefined, and the value of N is stored at the data block header. In an implementation, the index buffer is compressed by re-ordering the vertices by first use and omitting storage of the first index corresponding to every vertex (this index can be computed by incrementing a counter).

In one implementation, a primitive identifier can be derived from the primitive's position in the strip, and therefore does not need to be stored explicitly in the data block, further reducing memory usage. In another implementation, the data blocks further include encoded geometry identifiers. These can be encoded in two modes referred to as a "constant mode" and a "palette mode." In constant mode encoding, a geometry ID field in the data block stores a geometry ID and an opaque flag (indicating whether a triangle is opaque or transparent to incoming rays of light) that apply to all triangles. In palette mode, the geometry ID field is interpreted based on least significant bits (LSB) and most significant bits (MSB). These and other implementations are explained in further detail with respect to the description that follows.

The implementations described herein enable compact storage of large mesh models in a form that minimizes constraints on the content authoring, and enables direct rendering using encoded primitive data. In one implementation, different types of primitive meshes can be represented using the fixed-size data blocks, such that content creators are given fine-grained control over the compression rate to enable tradeoffs between accuracy and storage costs. Further, the encoded data is stored in a manner that the data is amenable for direct consumption by fixed-function hardware (as opposed to compute-shader based rendering). Further, the compression and storage of data disclosed herein enables lossy compression with precise control over data loss and direct rendering of the compressed representation of primitive data.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100. In several implementations, one or more of processors 105A-N are configured to execute a plurality of instructions to perform functions as described with respect to FIGS. 4-8 herein.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device (s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
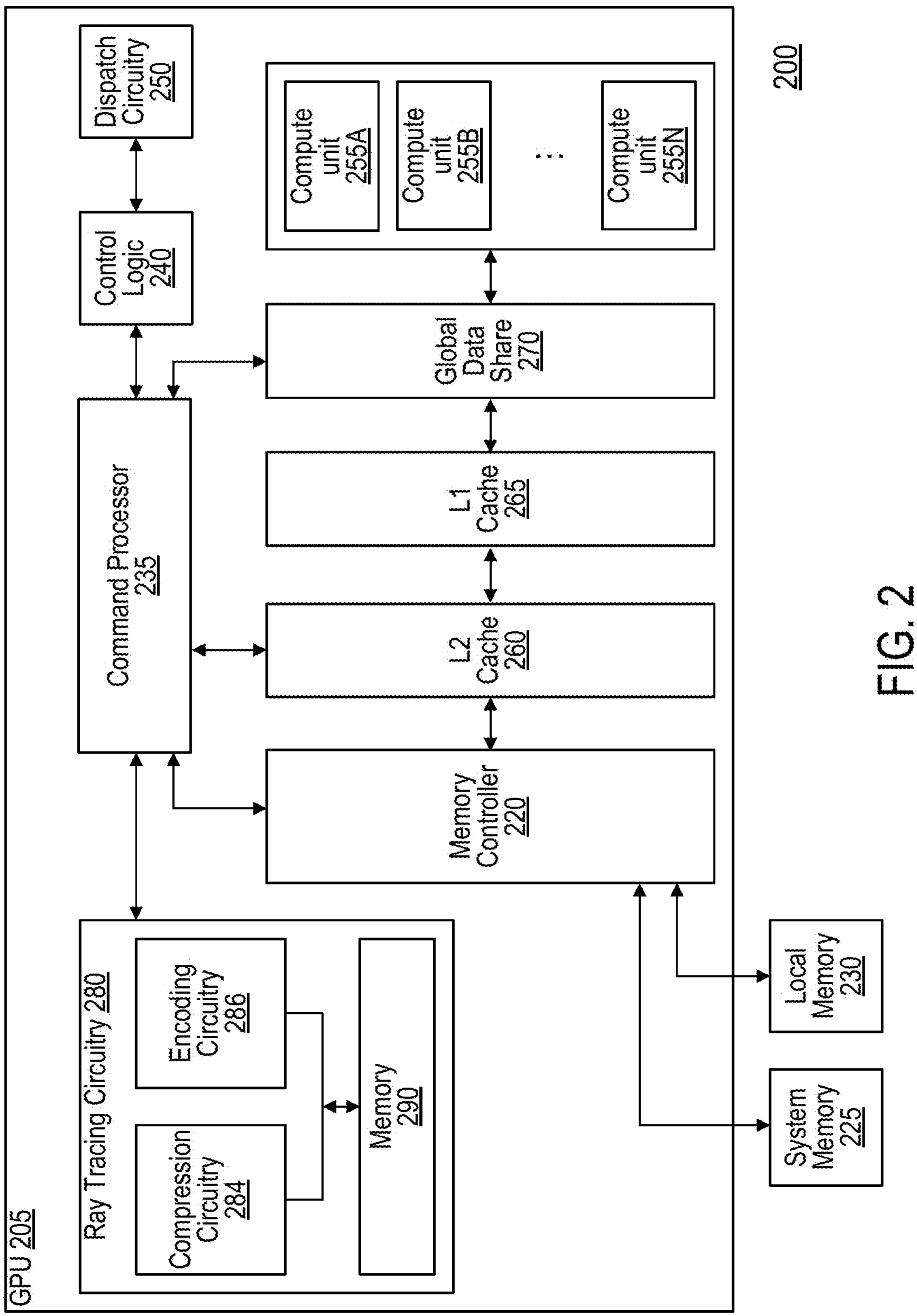
FIG. 2 illustrates the details of the computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1). System 200 further includes ray tracing circuitry 280 including compression circuitry 284, encoding circuitry 286, and memory 290.

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, ray tracing circuitry 280 is configured to perform ray tracing operations using an acceleration tree structure (e.g., a bounding volume hierarchy or BVH), including testing for intersection between light rays and objects in a scene geometry. In some implementations, much of the work involved in ray tracing is performed by programmable shader programs, executed on the compute units 255A-N. The ray intersection test fires a ray from an originating source, determines if the ray intersects a geometric primitive (e.g., triangles, implicit surfaces, or complex geometric objects), and if so, determines the distance from the origin to the intersection of the triangle. In an implementation, ray tracing tests use a spatial representation of nodes, such as those includes in the acceleration structure. For instance, in a BVH, each non-leaf node represents an axis-aligned bounding box that bounds the geometry of all children of that node. In one example, a root node represents the maximum extent over the area over which the ray intersection test is being performed. For instance, the root node can have child nodes, each representing a bounding box that typically divides the overall area. Each of these two child nodes can further have child nodes also representing bounding boxes. Leaf nodes represent triangles or other geometric primitives on which ray intersection tests are performed (described in FIG. 3).

Further, in an implementation, based on the tracing of rays within a scene geometry, acceleration structures are formed by command processor 235 and are stored in system memory 225 and/or local memory 230. A tree is loaded onto a memory, and the command processor 235 further executes optimizations on the hierarchical tree. Once a given acceleration structure is optimized, ray intersection tests are performed again and the ray tracing circuitry 280 uses the optimized structure to retest ray intersections in a given scene geometry. These tests are used by shader programs running on the compute units 255A-N to generate images using ray tracing accelerated by the optimized structure. The updated images are then queued for display by command processor 235.

In one implementation, triangle mesh models can be utilized for building acceleration structures, such as bounding volume hierarchies (BVHs) or spatial partitioning grids. When using these mesh models, geometric data is gathered that defines a triangle mesh model. This data can include vertex positions, vertex normals (vectors associated with a vertices of a 3D mesh), texture coordinates, and connectivity information (defining triangles by vertex indices). Each triangle in the mesh is then defined by three vertices and may optionally include other attributes like normals and texture coordinates. For each triangle, additional data like a bounding box or bounding sphere can be computed to quickly assess its spatial extent. For example, a bounding volume (typically an AABB-axis-aligned bounding box) for each triangle in the mesh can be computed. The bounding box encapsulates the triangle's spatial extent, providing a quick way to determine potential intersections without needing to check every triangle individually.

The triangles in the mesh can be sorted or partitioned to spatially organize the triangles to build the acceleration structure efficiently. Common approaches can include using spatial grids or hierarchical structures (like BVHs). Further, depending on the chosen acceleration structure, the hierarchy or grid-based structure is created using the sorted or partitioned triangles. In one example, for constructing BVHs, a recursive partitioning process is initiated, where triangles are split into groups based on a chosen splitting heuristic (e.g., median split, or surface area heuristic). A tree structure is then constructed, wherein each node represents a bounding volume enclosing a subset of triangles. In a BVH, the leaf nodes directly store references to individual triangles.

In some implementations, optimization techniques can be applied during structure construction to enhance traversal and intersection performance. For example, optimal split planes or grid cell sizes can be chosen based on scene statistics. Further, memory layout can be optimized for efficient cache usage during traversal. Once the acceleration structure is built, supplemental processing may also be performed. This can involve refining the structure, balancing tree nodes, or storing additional data (like precomputed normals or material properties) to expedite ray tracing computations.

In one or more implementations, large triangle mesh models can substantially increase rendering times in ray tracing due to the complexity of intersecting rays with detailed geometry. Ray-object intersection tests must be performed for each ray and potentially against numerous triangles, leading to higher computational demands. Large triangle mesh models further require significant memory resources to store and process during ray tracing. Memory-intensive data structures (such as acceleration structures) are needed to organize and efficiently access the mesh data during ray-object intersection calculations. Ray tracing methods may also require additional memory for storing intermediate results (like ray origins, directions, and shading information) during rendering.

Traditional models used in processing mesh models for building acceleration structures can therefore cause negative impacts on content authoring in ray tracing, since these models do not provide for compact storage of large triangle meshes. Further, since ray tracing often involves processing large amounts of geometric and shading data, including vertices, normals, texture coordinates, and material properties, this data can be voluminous, especially for complex scenes with detailed geometry. Traditional compression techniques can also fail to preserve the necessary precision of geometric and shading data to avoid visual artifacts or inaccuracies in the rendered image. Further, these methods introduce overhead in terms of decompression time and memory usage.

Compression techniques that disrupt sequential access patterns or require decompressing large blocks of data at once can be inefficient for real-time rendering. Furthermore, lossy compression techniques sacrifice data fidelity to achieve higher compression ratios. While this might be acceptable for certain types of data (e.g., textures), it can be problematic for geometric data where precision is critical.

In implementations described herein, a data format for encoding geometrical primitives efficiently into data arrays of fixed-size data blocks, hereinafter referred to as Dense Geometry Format or DGF blocks (e.g., data blocks of 128 bytes) is disclosed. In an implementation, these blocks can be directly consumed by processing circuitry (e.g., GPU 205) for ray traversal or rasterization. To create the DGF blocks, vertex data, before storage in a given block, is pre-quantized by the compression circuitry 284, and encoded by encoding circuitry 286, e.g., a quantization grid.

When encoding vertex data using variable-size integer offsets, compression circuitry 284 is configured to pre-quantize floating-point vertex coordinates into integers. In one example, floating-point values are multiplied by a scaling factor and rounded to the nearest integer. The quantized integer values as then stored as offsets relative to a base point (e.g., the minimum vertex value in a triangle mesh). These offsets can be positive or negative. Finally, encoding circuitry 286 can encode the offsets to store these offsets efficiently. In an example, each component of the vertex (e.g., x, y, z) can be encoded separately using variable-size integers. The encoded data can further include a vector that specifies the direction perpendicular to the surface at the vertex (i.e., "normal vectors" or "normals"). Normals are crucial for determining how light interacts with the surface, including calculating reflections, refractions, and shading. Further, if the object is textured, the data can include texture coordinates that specify how textures are mapped onto the surface. This data can be stored in memory 290 for further processing by the ray tracing circuitry 280.

In one implementation, encoded vertex data and other triangle data is stored as primitive meshes. In the context of ray tracing, a primitive mesh (e.g., triangle mesh) refers to a collection of primitives that represent a 3D surface or object, specifically tailored for rendering using ray tracing techniques. The primitive mesh data includes a set of vertices, where each vertex is defined by its 3D position and additional attributes like normals, texture coordinates, or colors (as described above). The mesh is composed of primitives, where each primitive is defined by indices pointing to the vertex data. For example, triangle meshes are often stored using optimized data structures like bounding volume hierarchies (BVHs) or KD-trees. These structures organize the triangles spatially to accelerate ray-triangle intersection tests.

It is noted that the implementations described herein refer only to triangle meshes, however, data corresponding to other primitive mesh types can be encoded using similar techniques. In one implementation, triangle mesh connectivity data is encoded by encoding circuitry 286 using a triangle strip, and an index buffer. As described herein, a "triangle strip" represents a series of connected triangles using a sequence of vertices. Triangle strips are used to describe and render a continuous surface or object composed of triangles. In a triangle strip, each triangle shares an edge with the previous triangle in the sequence. This shared edge is formed by two consecutive vertices in the vertex list. In one implementation, by sharing vertices between adjacent triangles, triangle strips require fewer vertex data compared to individual triangles, which reduces memory consumption and improves rendering performance.

In one or more implementations, the index buffer includes a fixed number of control bits per-triangle in the triangle strip (e.g., 2 bits), wherein each control bit indicates the triangle's position relative to previously identified triangles in the strip. In an implementation, the length (or size) of the index buffer is determined based on the contents of the control bits (as described later in FIG. 5). The index buffer includes two sections each storing a set of bits, wherein each bit corresponds to a triangle vertex. The first section of the index buffer includes a data array of "is-first" bits. Each "is-first" bit indicates whether it is the first index corresponding to a given vertex. The second section includes a second array of bits, storing 'N' bits per index to store each non-first index, wherein the value of N is predefined, and the value of N is stored at the data block header. In one implementation, the index buffer is compressed by re-ordering vertices by first use and omitting storage of the first index to every vertex, as identified using the is-first bits. This enables calculating the first index of a given vertex, by simply using a counter, e.g., by counting the number of is-first bits that were encountered before the given vertex. In an example, a single is-first bit per index is used to indicate whether it is the first index to its corresponding vertex. Further, the non-first indices are directly stored in a tightly packed buffer (i.e., a data structure where elements are stored contiguously without any additional padding or alignment between them).

In one implementation, a triangle identifier can be derived from the triangle's position in the triangle strip, and therefore does not need to be stored explicitly in the data block, thereby further reducing required storage. Further, geometry identifiers are encoded by encoding circuitry 286 in two modes, i.e., "constant mode" and "palette mode." In constant mode encoding, a geometry ID field in the data block stores a geometry ID and an opaque flag that apply to all triangles. In palette mode, the geometry ID field is interpreted based on least significant bits (LSB) and most significant bits (MSB). These and other implementations are explained in further detail with respect to FIGS. 5-7.

The implementations described herein enable compact storage of large triangle mesh models in a form that minimizes constraints on the content authoring, and enables direct rendering using encoded primitive data. In one implementation, different types of primitive meshes can be represented using the fixed-size data blocks, such that content creators are given fine-grained control over the compression rate to enable tradeoffs between accuracy and storage costs. In an implementation, the format of data stored in the data block can be aligned to cache lines of the GPU 205. Further, the encoded data is stored in a manner that the data is amenable for direct consumption by fixed-function hardware (as opposed to compute-shader based rendering). In one implementation, the encoding of triangle strip as disclosed herein enables a smaller encoding bandwidth and cheaper decompression of encoded data. Further, the compression and storage of data disclosed herein enables lossy compression with precise control over data loss and direct rendering of the compressed representation of primitive data.

In an implementation, ray tracing circuitry 280 as described herein refers to specialized hardware components or dedicated processing units designed to accelerate ray tracing, a rendering technique used in computer graphics to generate highly realistic images by simulating the behavior of light. Although shown as integral to the GPU 205, in one or implementations, the ray tracing circuitry 280 can also be a standalone hardware unit. These implementations are contemplated.

Figure 3:
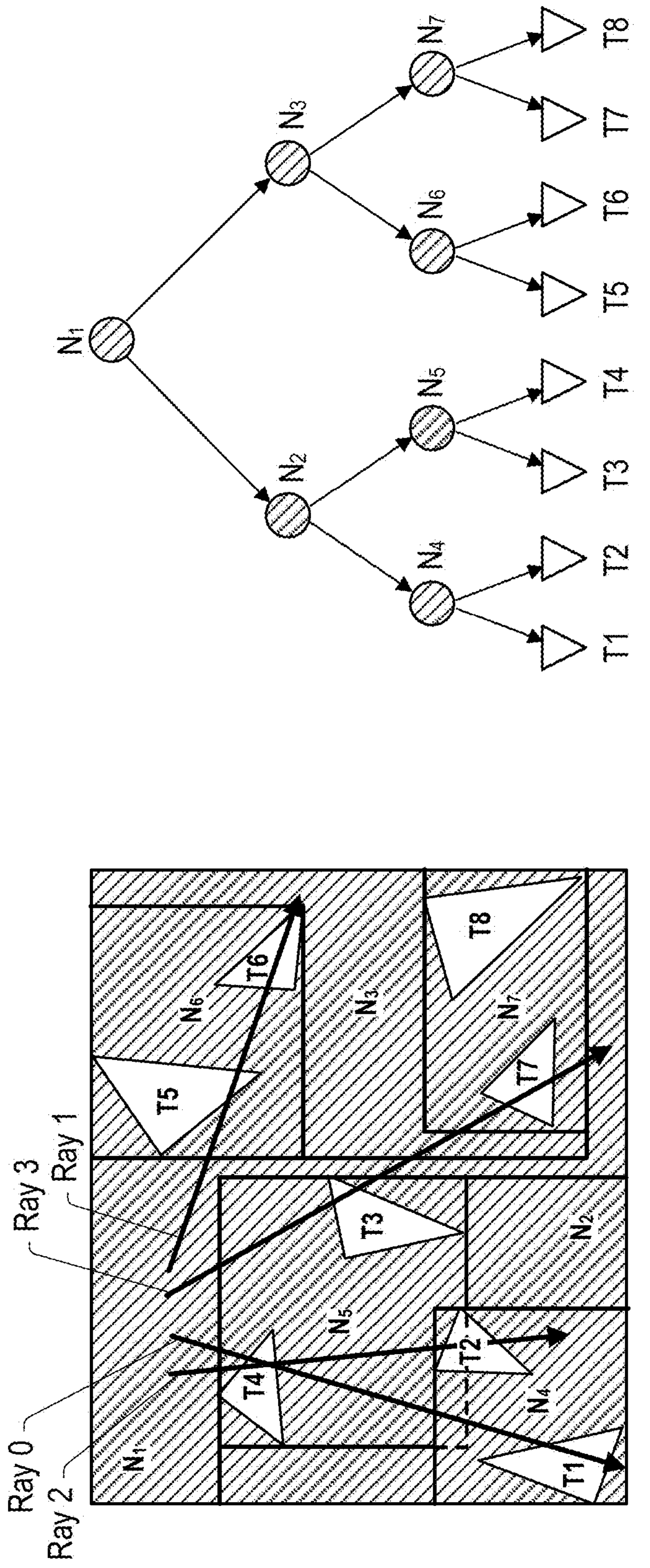
FIG. 3 is an illustration of a bounding volume hierarchy (BVH), according to an implementation.

FIG. 3 is an illustration of a bounding volume hierarchy (BVH), according to an implementation. For simplicity, in the exemplary implementation depicted in FIG. 3, the hierarchy is shown in two-dimension. However, in various alternate implementations, extension to three-dimension may be possible, and it should be understood that the methods described herein would generally be applicable to three-dimensional hierarchies as well.

The spatial representation 302 of the BVH is illustrated in the left side of FIG. 3 and the tree representation 304 of the BVH is illustrated in the right side of FIG. 3. In one example, the bounding volumes are represented by "N," such that N1-N7, are distinct bounding boxes. In the example, bounding box N1 encompasses all other bounding boxes N2-N7. Further, each bounding box N2-N7 includes one or more triangles, that represent geometric objects, and are denoted by "T." For example, bounding box N1 includes all other bounding boxes and their respective triangles T1-T8. In a similar manner, bounding box N2 includes smaller bounding boxes N5 and N4, such that N4 includes triangles T1 and T2, and N5 includes triangles T4 and T3. Further, for the sake of brevity, in the tree representation 304 the bounding boxes are each represented by a non-leaf node "N" and each triangle is represented by leaf nodes T.

In order to perform ray tracing for a scene, a processing unit (e.g., ray tracing circuitry 280 of FIG. 2) performs a ray intersection test by traversing through the tree 304, and, for each bounding box tested (i.e., by traversing respective internal nodes N), eliminating branches below a traversed node if the test for that node fails. In one example, it is assumed that ray 1 intersects triangle T5 as the closest hit. The processing unit would test against bounding box N1 and then after returning a hit, fetch the resulting child node, which contains bounding boxes for the next level of hierarchy below N1 (nodes N2 and N3). When this node data returns from memory, bounding boxes for N2 and N3 are tested. The processing unit returns a failure or miss result against bounding box N2 (since ray 1 does not interact with the bounding box). The processing unit eliminates all subnodes of node N2. Since ray 1 does interact with bounding box N3, it would return a hit and then subsequently fetch N3 from memory, which contains bounding boxes for N6 and N7. Tests are then performed against bounding boxes N6 and N7, by traversing through their respective representative nodes N6 and N7, noting that the test for node N6 succeeds but for node N7 fails. The processing unit would then test triangles T5 and T6 by traversing through representative leaf nodes T5 and T6, noting that test determines that T5 is the closest hit for the ray, and therefore the test for T5 succeeds, but T6 fails (even though the ray might hit T6, however it is not the closest hit).

In an implementation, the BVH 304 is generated using a given scene geometry. The scene geometry includes primitives that describe a scene comprising one or more geometric objects, which are provided by an application or other entity. In one implementation, software executing on a processor, such as the command processor 235, is configured to perform the functionality described herein, hard-wired circuitry configured to perform the functionality described herein, or a combination of software executing on a processor and hard-wired circuitry that together are configured to perform the functionality described herein. In various examples, the BVH 304 is constructed using one or more shader programs, such as executing on the processing unit, or on a hardware unit in a command processor. In various embodiments, the BVH 304 is constructed prior to runtime. In other examples, the BVH 304 is constructed at runtime, on the same computer that renders the scene using ray tracing techniques. In various examples, a driver, an application, or a hardware unit of a command processor performs this runtime rendering.

In an implementation, a data structure comprising one or more data fields, each containing information pertaining to the different nodes of the BVH 304, for which intersection testing is to be performed, is stored in a memory location accessible by the processing unit. For example, the data structure is stored in system memory 225 or local memory 230 (as shown in FIG. 2), such that each time a hierarchical tree is created and/or updated, the data structure is updated by the processing unit. An exemplary data structure includes node metadata such as, but not limiting to, node identifiers, node surface areas, node subtree information, node lock status, and node bounding boxes, etc.

In one or implementations, the BVH 304 can be formed as a combination of top level acceleration structure (TLAS) and bottom-level acceleration structure (BLAS). The TLAS (e.g. nodes N2-N7) is a hierarchical data structure that organizes a collection of BLAS representing individual geometric objects or primitives (e.g., triangles T1-T8) within a scene. The TLAS is designed for rapid traversal of rays through the scene by identifying relevant BLAS instances that may intersect with the ray. In an implementation, data pertaining to geometric primitives, e.g., to be utilized for building the BVH 304 can be provided in a pre-compressed format, such that a ray tracing application can compute compressed geometry representation and upload this data to a GPU memory for further processing.

In an implementation, pre-compressed primitive data is stored in DGF blocks. Further, before generating compressed primitive data, the primitives are clustered in a manner such that each DGF block stores data corresponding to primitives that are spatially localized in a given scene. That is, data in each DGF block corresponds to primitives that can be grouped together to represent a single node of the acceleration structure (e.g., BLAS internal node). Since the primitives are clustered before the BVH is constructed, build speed can be substantially enhanced. In an example, a predetermined number of DGF blocks (e.g., storing data for a total of 65-128 primitives) can together form a data node that represents a single BLAS internal node of the BVH. A data node reference is generated for each data node storing multiple DGF blocks, e.g., when these data nodes are created. This reference can be mapped to the BLAS node it represents. The corresponding BLAS node is then constructed based on the data node reference. This acceleration structure can further be combined with other TLAS and BLAS nodes to complete construction of the BVH.

Figure 4:
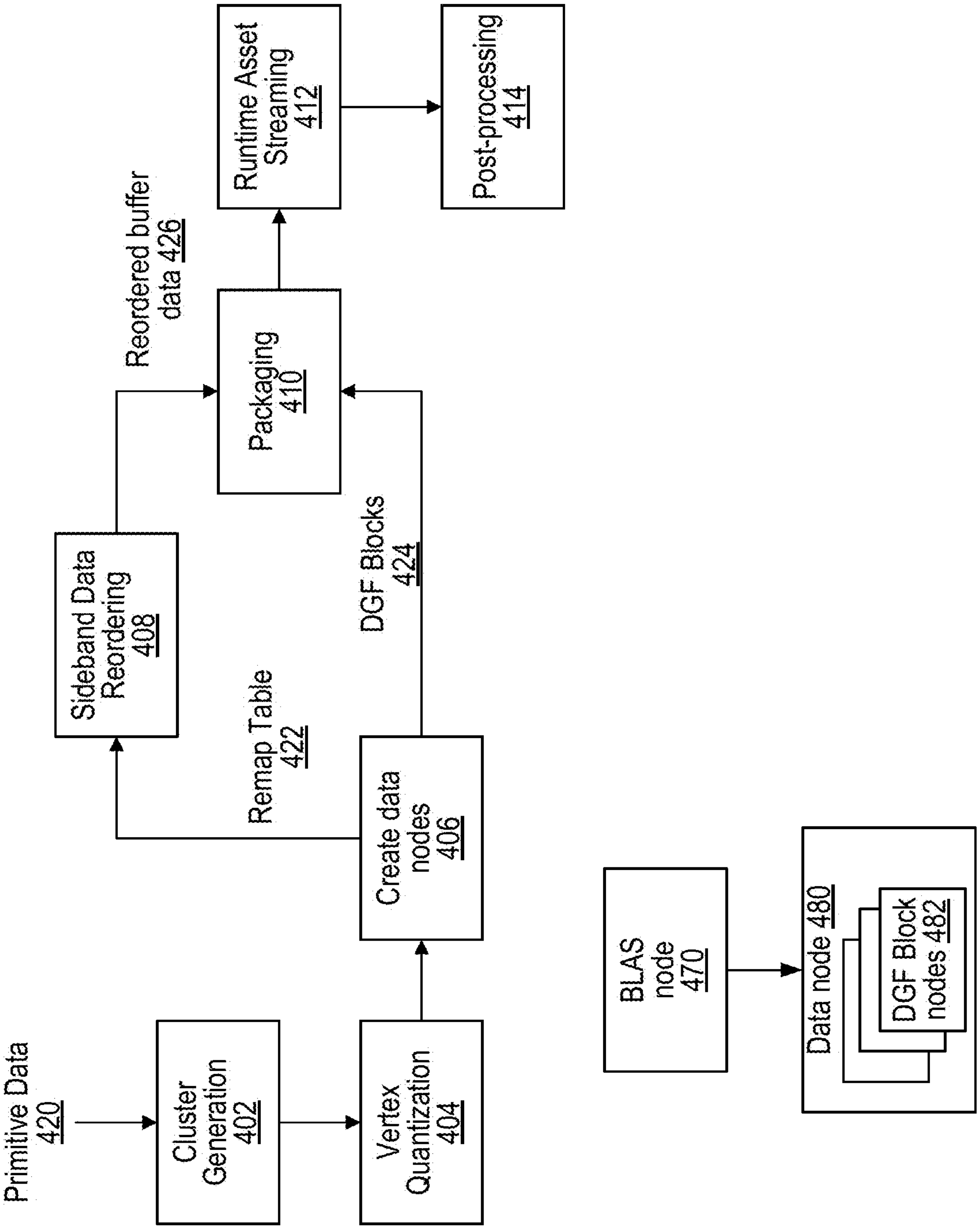
FIG. 4 is a block diagram illustrating encoding of primitive data for generation of acceleration structures.

Turning now to FIG. 4, a block diagram illustrating encoding of primitive data for generation of acceleration structures has been described. As described in the foregoing, geometrical primitives included in primitive meshes are encoded and the encoded data is stored using data arrays of fixed-size data blocks (e.g., blocks of 128 bytes) to be directly consumed by a processing circuitry (e.g., GPU 205) for ray traversal or rasterization. In one or more implementations, the encoded data is generated in the form of a "dense geometry format (DGF)" data block (e.g., DGF block shown in FIG. 5). As described herein, a DGF data block includes various data buffers to store information pertaining to vertex indices, geometry identifiers, mesh connectivity, and opacity data pertaining to each primitive in the mesh. In one implementation, the DGF block is a fixed-size data block, e.g., consisting of an array of data blocks of 128 bytes that encode triangle data. In this example, each data block stores a maximum of 64 triangles and 64 vertices. This data structure enables partitioning triangle meshes into small, spatially localized triangle sets, and "packs" each set into a minimal number of DGF blocks.

In an implementation, primitive data 420 is initially clustered using a surface area heuristic (SAH) clustering strategy (block 402) for optimal raytracing performance. Pre-clustering the geometry based on SAH accelerates the BVH build, since a BVH builder receives an efficient spatial partitioning, and does not need to construct the partitioning from the original, larger triangle set. Initially, all triangles are clustered in a single cluster representing the root of a BVH (e.g., BVH 304). A splitting plane (axis-aligned) that divides the current cluster of triangles into two sub-clusters is then chosen. In one implementation, the choice of the splitting plane is determined by evaluating different candidate planes based on the SAH. For each candidate splitting plane, the SAH cost is evaluated which considers a surface area cost and a traversal cost. The splitting plane that minimizes the SAH cost is selected and the current cluster of triangles is divided into two sub-clusters based on the selected splitting plane. Each sub-cluster will represent a child node in the BVH. This process is performed recursively for each child node (sub-cluster) until a termination condition is met (e.g., maximum depth of the BVH, minimum number of triangles per node, etc.).

In an implementation, vertices corresponding to each triangle in each SAH cluster are encoded to generate quantized vertices per-triangle (block 404). In one example, vertices are defined on a signed fixed-point grid to compress vertices data. For example, for quantization of data pertaining to vertices, vertices data is first defined using a 24-bit signed base position in the grid. In an implementation, a variable-width (e.g., 1-16 bits) unsigned offset for each vertex (relative to the base position) is further generated. Finally, a power-of-2 scale factor, used to map the quantization grid to floating-point coordinates for each triangle vertex, is stored as an "IEEE biased exponent". The IEEE biased exponent is a component of the floating-point representation used in the "IEEE 754 standard" for representing real numbers in computers. In this standard, a floating-point number is typically represented as a combination of three components: the sign bit, the exponent, and the significand (or mantissa). The biased exponent is a way to represent the exponent with a fixed offset that allows for various comparison and arithmetic operations.

The data resultant from vertex quantization, in one implementation, is stored in a DGF block, and multiple DGF block nodes are combined to create a data node (block 406). In one example, each DGF block can store data for up to 64 triangles, whereas each data node can store data pertaining to 256 triangles, 256 vertices, and 64 materials. In one implementation, each data node corresponds to a BLAS node of a BVH. An example shown in the figure depicts a BLAS node 470 (e.g., an internal node of a BVH to be constructed) corresponding to data node 480, which stores multiple DGF block nodes 482. Further, a reference corresponding to each data node is generated, e.g., at a point when these data nodes are created. This reference can be mapped to the BLAS node the data node represents. That is, these references can be used to construct the BLAS node at the time of construction of the BVH.

In one implementation, each DGF block further includes data pertaining to triangle mesh connectivity, i.e., mesh topology data. According to the implementation, mesh topology data is encoded using triangle strips. For each triangle, two control bits are generated that indicate a position of the triangle relative to two previously identified triangles within the strip. In one implementation, these bits are encoded such that they indicate a position of a triangle being currently processed, e.g., based on positions of previously identified triangles within the strip. For instance, the control bits can indicate whether a new strip needs to be initiated using the current triangle, whether a first edge of a last identified triangle needs to be reused for the current triangle, whether a second edge of a last identified triangle needs to be reused for the current triangle, or whether an opposite edge of a predecessor's predecessor triangle is to be reused for the current triangle.

In one implementation, based on the content of the control bits, an index buffer is created. The buffer is divided into two parts: a first array to store bits identifying whether a given index is a first index for a given vertex ("is-first" bits), and a second array to store bits pertaining to non-first indices to vertices (non-first bits). The is-first bits include one bit per vertex reference, indicating whether it is a first reference to a given vertex. In one implementation, the index buffer is compressed by re-ordering vertices by first use and omitting storage of the first index to every vertex, as identified using the is-first bits. This enables calculating the first index of a given vertex, by simply using a counter, e.g., by counting the number of is-first bits that were encountered before the given vertex. In an example, a single is-first bit per index is used to indicate whether it is the first index to its corresponding vertex. In one implementation, the first three vertex references for a triangle, will always be first vertex references, and accordingly corresponding is-first bits for these references need not be stored. Further, the non-first indices are stored using 'N' bits per index, wherein the value of N is predefined. In one implementation, the value of N is stored in the header of a corresponding DGF block.

In an implementation, triangles in the mesh can be further reordered or rotated to maximize compression of mesh topology data. According to the implementation, triangles within the mesh can be reordered and triangle vertices can be rotated in a manner so as to preserve triangle winding. Preserving triangle winding in a mesh is crucial for maintaining the correct orientation of triangles, which directly affects how the mesh is rendered and shaded in computer graphics. The winding order of triangles (i.e., clockwise or counterclockwise winding) determines whether triangles are facing towards or away from the viewer, impacting visibility and rendering outcomes like shading, lighting, and culling.

The reordering of mesh topology data is performed based on a remap table 422. The remap table 422 includes a data structure to translate input values (i.e., originally generated mesh topology data) into corresponding output values (reordered mesh topology data) according to a predefined mapping. In one implementation, the remap table 422 has one entry for each triangle. Each entry stores the index of a given triangle in an input triangle ordering (0 . . . N−1), and further stores, an index of each vertex (herein "input vertex") that corresponds with each of the triangle's 3 vertices (0, 1, or 2). This mapping can be used to reorder the mesh topology while maintaining the original triangle ordering.

The reordering of mesh topology data can be performed using a sideband data buffer using offline pre-processing (block 408). In an implementation, the sideband data includes an array of per-triangle elements (colors, normals, etc.). When reordering the topology, the sideband data also needs to be reordered to match the order in which triangles are connected. For each element in the sideband data, the input index from the corresponding remap table 422 entry is loaded, and a corresponding element from sideband data is mapped to the entry. Further, if the data depends on the order of the vertices in the original triangle, then the input vertex ordering from the remap table 422 is used to re-arrange it accordingly.

Based on the reordering of triangles in the mesh, corresponding index buffer data is also updated to generate reordered buffer data 426. The next step in the process is packaging of the encoded DGF blocks 424 and the reordered buffer data 426 (block 410) to generate packaged geometric data for ray tracing and rasterization operations.

The packaged geometric data undergoes processing (e.g., by a GPU or other processing circuitry) for use during runtime asset streaming (block 412), e.g., for dynamically loading and accessing geometric data into a software application or game during its execution or runtime. In an implementation, during streaming operations, the micro-BLAS nodes 480 can be accessed and processed by one or more application drivers, or hardware systems, as and when specific triangle data is required by an application (block 414). An exemplary DGF block is discussed in detail with reference to FIG. 5.

Figure 5:
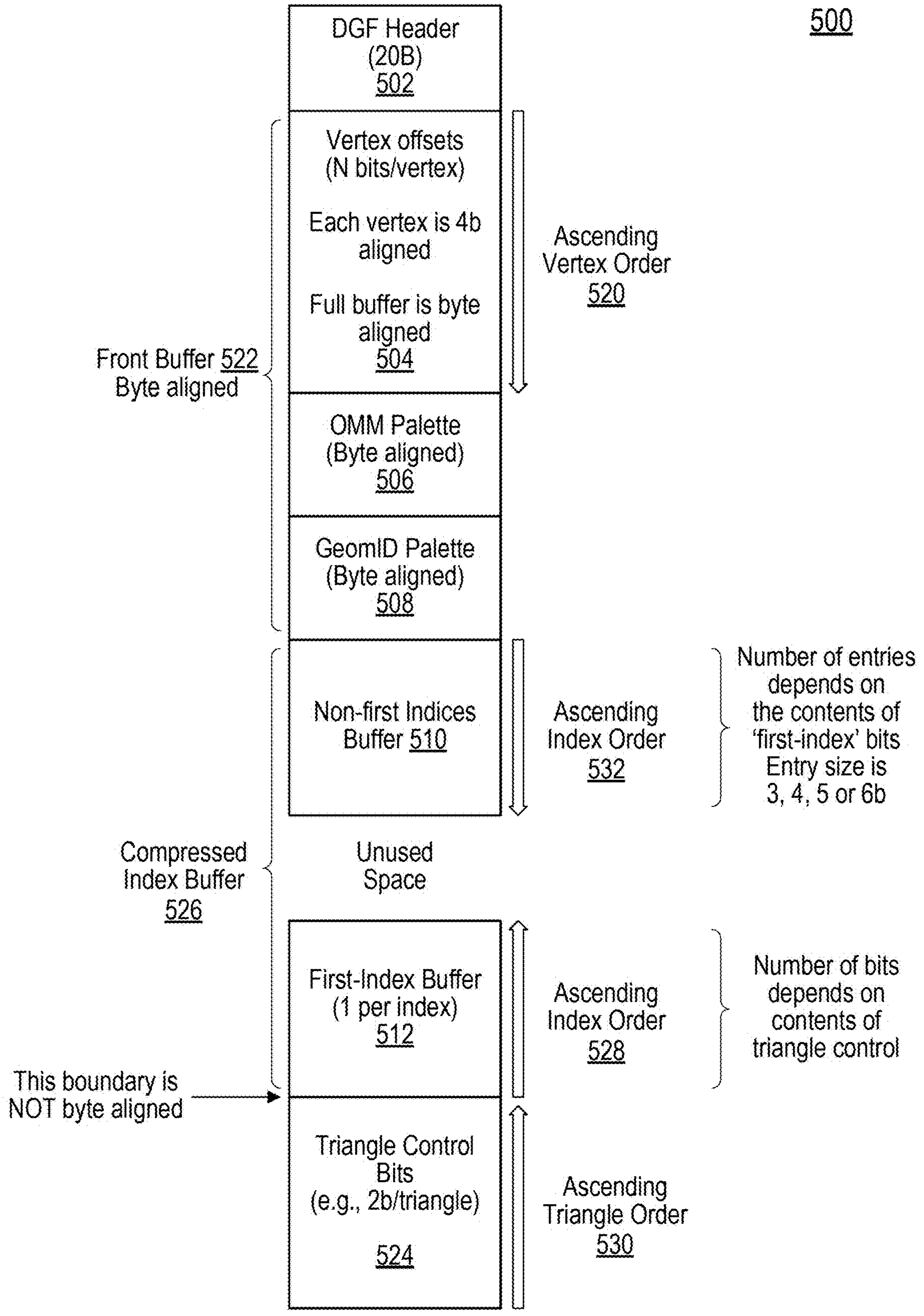
FIG. 5 illustrates a Dense Geometry Format (DGF) block for storing encoded primitive data.

FIG. 5 illustrates a Dense Geometry Format (DGF) block 500 for storing encoded primitive data. A DGF data block includes various data buffers that store information pertaining to vertex indices, geometry identifiers, mesh connectivity, and opacity data pertaining to each primitive in the mesh. In one implementation, the DGF block 500 is a fixed-size data block, e.g., consisting of multiple buffers storing encoded primitive data and totaling 128 bytes. In this example, the DGF block 500 stores a maximum of 64 triangles and 64 vertices. This data structure enables partitioning triangle meshes into small, spatially localized triangle sets, and "packs" each set into a minimal number of DGF blocks.

In one implementation, the first 5 Double Words ("Dwords") of the DGF block 500 include a fixed header 502, whose structure is as shown in the figure (all bit fields are ordered from least significant bit (LSB) to most significant bit (MSB)). "Dwords" typically refer to "double words" in the context of computer memory that are units of data twice the size of a standard word. The specific size of a double word can vary depending on the computer architecture and the word size of the system. For example, on a 32-bit system, where a word is typically 32 bits (4 bytes), a Dwords would be 64 bits (8 bytes). Similarly, on a 64-bit system, where a word is 64 bits (8 bytes), a Dword would also be 64 bits (8 bytes), but the term might still be used contextually. The layout of the header 502 is given by the following pseudocode.

struct DGFHeader

```
{
// DWORD 0
uint32_t magic              :  8; // must be 0x6
uint32_t bits_per_index     :  2; // Encodes 3,4,5,6
uint32_t num_vertices       :  6; // Number of vertices (1-64)
uint32_t num_triangles      :  6; // Number of triangles (1-64)
uint32_t geom_id_meta       :  10;
// DWORD 1
uint32_t exponent           :  8; // Float32 scale (exponent-only)
with bias 127. Values
int32_t x_anchor            :  24;
// DWORD 2
uint32_t x_bits             :  4; // 1-16 (add 1 when decoding)
uint32_t y_bits             :  4; // 1-16 (add 1 when decoding)
int32_t y_anchor            :  24;
// DWORD 3
uint32_t z_bits                4; // 1-16 (add 1 when decoding)
uint32_t geom_id_mode          1; // 0 = Constant Mode 1= Palette
Mode
int32_t z_anchor               24;
// DWORD 4
uint32_t prim_id_base          29;
uint32_t unused                3; // must be 0
// 108B of variable-length data segments follow.
}
```

As shown in the figure, vertex data 504 is packed in the DGF block 500, immediately following the header 502, in an ascending vertex order 520. In one implementation, the size of each vertex is 4 byte aligned. Further, the size of the vertex data section is also byte-aligned. Pad bits can be inserted as required, and all pad bits must be zero. In an implementation, the pad bits are used to align data to byte boundaries, which reduces hardware decoding cost. As described herein a "byte-aligned" buffer refers to a region of memory where data is stored such that each data element or structure begins at an address that is a multiple of a certain byte boundary. This alignment ensures that data can be efficiently accessed by a processor, particularly on architectures that require specific alignment for optimal performance.

The block 500 further includes an optional opacity micro map (OMM) palette 506 that starts on the next byte boundary, and an optional Geometry Identifier (GeomID) palette 508 that starts on a byte boundary following the vertex data 504 and OMM palette 506. The region containing the header 502, vertex data 504, GeomID palette 508, and OMM palette 506 is referred to as the "front buffer" 522. The front buffer 522 is byte aligned, and its total size may be lesser than equal to 96 bytes, in one implementation.

As described earlier, vertices are defined on a signed 24-bit quantization grid. Vertex data 504 stores the following: a 24 bit per coordinate signed anchor position, a variable-width (1-16 bits) unsigned offset for each vertex (relative to the anchor position), a power-of-2 scale factor which is used to map from the quantization grid to floating-point world coordinates (stored as an IEEE biased exponent). The decoded floating-point vertex position can be computed using the following pseudocode.

```
float3 dgf_decode (int24_t Anchor[3], uint16_t Offset[3], uint8_t Exponent)
{
int x = Anchor[0] + Offset[0]; // 24b + 16b add.. 25b result
int y = Anchor[1] + Offset[1];
int z = Anchor[2] + Offset[2];
float fx = (float)(x); // convert results to float
float fy = (float)(y);
```

-continued

```
float fz = (float)(z);
// apply a pow2 scale factor
float scale = ldexp(1.0f, Exponent − 127);
return float3(fx, fy, fz) * scale;
}
```

With this encoding scheme the maximum representable value is: (0x7fffff+0xffff)*2^127=8,454,142*2^127 (roughly 1.438e+45), and the minimum representable value is: (0x800000*2^127)=−8,388,608*2^127 (roughly −1.427*e*+45). This is a larger theoretical dynamic range than IEEE floating point. The minimum and maximum IEEE floats which can be encoded using the DGF block 500 occurs for exponent 232 and integer positions 0x800001 and 0x7fffff (Decimal values-8388607 and 8388607). These values are: −340282326356119256160033759537265639424.000000 and +340282326356119256160033759537265639424.0.

In an implementation, the DGF block 500 can support exponent values from 1 through 232. In one implementation, if a DGF block encodes an exponent value outside the supported range, all ray-triangle intersection tests against this block may have undefined results. However, ray tracing applications can ensure error-free results across blocks by selecting matching quantization factors for any two neighboring blocks. This can be done by selecting a uniform quantization factor for an entire mesh. In another implementation, combination of base position and vertex offsets during encoding can cause errors for meshes containing very large triangles. This issue can be navigated by choosing a coarser quantization factor (trading off precision), subdividing large, problematic triangles (whether automatically or manually), or reverting to uncompressed geometry for problematic assets.

As described in the foregoing, mesh topology is encoded using triangle strips. In one implementation, the order of the stored vertices is used to minimize the size of the topology encoding. That is, instead of storing data each time a new vertex is referenced for the first time, the first reference is identified by means of a counter. For encoding the mesh topology, the following data structures are generated-triangle control bits 524 and an index buffer 526. The triangle control bits 524 include two control bits per triangle indicating a triangle's position relative to previous two triangles (described in detail in FIG. 6). Further, the length of the index buffer 526 is determined by the contents of the control bits. The index buffer 526 is further organized into two sections-a first-index buffer 512, for storing bits each representing a first reference to a given vertex in a given strip, and non-first indices buffer 510, each representing a non-first reference to a given vertex.

In one implementation, the index buffer is compressed by re-ordering vertices by first use and omitting storage of the first index to every vertex, as identified using the is-first bits. This enables calculating the first index of a given vertex, by simply using a counter, e.g., by counting the number of is-first bits that were encountered before the given vertex. In an example, a single is-first bit per index is used to indicate whether it is the first index to its corresponding vertex. In one example, the first three indices of each vertex are always 'first references', and therefore corresponding is-first bits for these indices need not be stored. As shown, data in the first-index buffer 512 is stored in an ascending index order 528. The control bits and is-first indices are allocated from the back of the block 500, and can make hardware decode easier because the data is indexed from a known start position, and fewer computations may be needed to locate the data for a particular triangle. Ascending order for the first-index buffer 512 renders the buffer data consistent with the vertex data (thereby avoiding storing the number of indices). Further, in an implementation, there is one index for each zero bit in the is-first bit vector. That is, the number of indices in the first-index buffer 512 is the number of zero bits in the 'is-first' bit vector. Indices whose 'is-first' bits are 1 can be calculated using counters, instead of storing them explicitly.

Further, for the non-first indices buffer 510, the number of bits per non-first index is stored in the header 502. In one example, valid values of the number of bits per non-first index can be 0, 1, 2, 3, encoding 3, 4, 5, and 6 bits, respectively. In one implementation, the total size of the first-index buffer 512 is lesser than or equal to 24 bytes. Further, the non-first indices buffer 510 is located immediately adjacent to the front buffer 522, as shown. The data in the non-first indices buffer 510 is stored in ascending vertex order 532. The triangle control bits 524 are located at the end of the DGF block 500, and the first-index buffer 512 is stored immediately in front of the triangle control bits 524. Further, boundary between compressed index buffer 526 and triangle control bits 524 may or may not be byte aligned.

In one implementation, the DGF block 500 further stores geometry identifiers (GeomID 508) and opacity micro-maps flags (OMM flags 506). GeomID 508 can be used to uniquely identify and reference specific geometric entities or elements within a scene. This identifier helps in efficiently managing and manipulating geometric data in various graphics applications. Further, OMM flags cab include Boolean or numerical values associated with materials or objects to control their opacity properties. The GeomID 508 and OMM flags 506 can be stored in two different modes, wherein the mode is selected based on a geometry ID field in the header 502. The two different modes include a constant mode and a palette mode. When the value of the field is 0, a constant mode is selected, and when the value of the field is 1, a palette mode can be chosen.

In constant mode, bit 0 of the geometry ID field 508 includes an opaque flag, and bits 1-9 store a geometry identifier. These values are used for all triangles. In this mode, no additional data are stored in the block 500, and more space is available for vertex data. In palette mode, the geometry ID field is interpreted as LSBs and MSBs. For example, LSBs (4:0) encode a GeomID prefix size in bits (5b, 0-25) and MSBs (9:5) encode a GeomID count (5b, 1-32) (1 bit is added when decoding). For instance, in palette mode, geometry ID field 508 is used to store the properties of the palette. For example, the upper bits encode the number of geometry identifiers in the palette. The lower bits hold the number of bits (out of 25) which have the same value across all IDs (those bits are stored once instead of being repeated). Further, in palette mode, a GeomID palette structure is inserted in the block (as shown by GeomID 508). The position and size of the palette structure are aligned to byte boundaries. In one implementation, pad bits can be appended as required, however all pad bits must be zero.

In one implementation, the GeomID 508 palette consists of a prefix value whose bit length is given in the 5 LSBs of the geometry ID field and a per-triangle index buffer identifying a payload to use for each triangle. The size of each index is given by ceil (log 2(GeomID count)), where the "ceil (parameter (X)" function returns the smallest integer not less than the parameter (X). Further, an array of N-bit payloads, where N is 25−prefixSize. In an implementation, the size of the per-triangle index field is only as large as needed to index all stored values. Further, ceil (log 2(GeomID count)) gives the number of bits needed (using the ID count, which comes from the geometry ID field 508). The LSB of each payload contains an opaque flag. The 25b GeomID and opaque flag for a given triangle are decoded by selecting a payload from the payload buffer, and concatenating it with the prefix value. The following pseudocode illustrates this process:

```
// Helper function to extract a bit field from the DGF block
uint ReadBits(uint bitPos, uint numBits);
uint get_id_and_opacity(uint geom_id_meta, uint triIndex, uint triCount);
{
uint prefixSize = geom_id_meta & 0x1f;
uint payloadSize = 25 - prefixSize;
uint geomIDCount = ((geom_id_meta >> 5) & 0x1f) + 1;
uint indexSize = 32 - lzcount(geomIDCount - 1);
uint paletteBitPos = ComputePaletteBitPosition( );
uint prefix = ReadBits(paletteBitPos, prefixSize);
uint indexBufferPos = paletteBitPos + prefixSize;
uint index = ReadBits(indexBufferPos + triIndex * indexSize, indexSize);
uint payloadBufferPos = indexBufferPos + triCount * indexSize;
uint payload = ReadBits(payloadBufferPos, index, payloadSize);
return (prefix << payloadSize) | payload;
}
```

In one non-limiting example, supposing a total of 8 triangles, the per-triangle GeomID is given by: 1, 4, 1, 1, 4, 3, 1, and 4. There are 3 unique ID values (1, 4, and 3), so the number of palette entries is computed as 3. In binary these values (as 25b numbers) are given by: 0000000000000000000000001, 0000000000000000000000100, and 0000000000000000000000011 respectively. The upper 22 bits are the same (all zero in this case), so the prefix size is 22. In palette mode, geometry ID field 408 is a 10-bit field split into two halves. The top 5 bits contain the number of entries, e.g., using bias-1 encoding (encodings 0 . . . 31 correspond to 1 . . . 32). For 3 palette entries, the encoded value is computed as 2. The lower 5 bits contain the prefix size (22). Therefore, the value stored in geometry ID field 408 would be: (2<<5)+22=86. The palette has 47 bits of data (25 bits for ID values and 22 bits for prefix size). An extra zero bit is added at the end to align it to a byte boundary (totaling to 48 bits). The resulting bits are given by: 0000000000000000000000 001 100 011 00 01 00 00 01 10 00 01 0.

In one implementation the OMM palette 506, if present, is also byte aligned. Pad bits are inserted as required, and all such bits must be zero. The OMM palette 508 includes a "hot-patched" section, and a "pre-computed" section (not shown). The hot-patched section is patched at runtime with OMM information when an acceleration structure is constructed. The pre-computed section is computed by encoding circuitry at the time of encoding data within the DGF 500. The size and position of the hot-patched section can be exposed to one or more applications through an API. However, the precise contents of the hot patched section are not exposed. When encoding a DGF block, that is expected to be used with OMMs, the encoding circuitry reserves space for the hot-patched section, and stores the pre-computed section immediately after it. In one example, the hot-patched section contains 8 bytes, and an additional 4 bytes for each OMM descriptor. The application using the block initializes this space with zeros. The pre-computed section includes a per-triangle index indicating which OMM descriptor to use. Triangles are ordered from front to back in ascending order 530. The number of bits per index is derived from an OMM descriptor count field in the header 502. The pre-computed section is padded out to the next byte boundary, and all pad bits must be zero. In one or more implementations, unused space in the DGF block 500, e.g., resulting from OMM Palette 506 or GeomID palette 508 data not being stored and/or otherwise, can be utilized to stored additional vertices data.

FIG. 6 illustrates a triangle strip used for encoding mesh topology data. As described in the foregoing, the DGF blocks store mesh topology data using a form of triangle strip. The encoded mesh topology data consists of an array of triangle control values, and a compressed index buffer. In one implementation, the control values include 'RESTART' bits, 'EDGE1' bits, 'EDGE 2' bits, and 'BACKTRACK' bits. As shown in the Table 650, the value of the RESTART bits is 0 (bits '00'), and these bits are used to start a new strip, specifying 3 vertex indices for a triangle. Further, the EDGE1 bits (value 1, bits '01') represent reusage of a second edge of a last identified triangle as a first edge of a current triangle. Similarly, the EDGE2 (value 2, bits '10') bits represent reusage of a third edge of a last identified triangle as a first edge of a current triangle.

In one implementation, the BACKTRACK bits (value 3, bits '11') represent that an opposite edge of a last identified triangle's predecessor triangle is reused. In this implementation 'opposite edge' is given by EDGE1 bits if the last triangle used EDGE2, or EDGE2 bits if the last triangle used EDGE1. Further, backtracking is not used to form a current triangle, unless the last triangle is formed using EDGE1 or EDGE2. That is, backtracking is not used to form a current triangle, after a new strip is initiated or if the last triangle was formed using backtracking. It is noted that when an edge of a previously identified triangle is reused, the reused edge is always the first edge in the new triangle, and the other two edges connect to a new vertex, which is always the third vertex in the triangle.

In the shown example, the vertex orders for the 3 identified triangles are given by the following bits (arrows within each triangle depict order of vertices):

- RESTART: 0, 1, 2 (new strip 600 started with triangle 602 formed using vertices 0, 1, and 2);
- EDGE1: 2,1,3 (second triangle 604 formed using vertices 2, 1, and 3, and reusing the 1-2 edge from triangle 602); and
- EDGE1: 3,1,4 (third triangle 606 formed using vertices 3, 1, and 4, and reusing the 1-3 edge from triangle 604).

The four possible vertex orders for the next triangle depend on their corresponding control values, and can be one of the following:

- RESTART: 5,6,7 (new strip started with triangle formed by vertices 0, 1, and 2), as shown by dotted triangle 608;
- EDGE1: 4,1,5 (new triangle formed using vertices 4, 1, and 5, and reusing the 1-4 edge from triangle 606) as shown by dotted triangle 610;
- EDGE2: 3,4,5 (new triangle formed using vertices 3, 4, and 5, and reusing the 4-3 edge from triangle 606) as shown by dotted triangle 612; or
- BACKTRACK: 2,3,5 (new triangle formed using vertices 2, 3, and 5, and reusing the 3-2 edge from the triangle 604), as shown by dotted triangle 614.

In one implementation, whenever an edge is re-used, corresponding vertices are reversed so that triangle winding is maintained. Triangle meshes with mixed winding can be encoded by restarting the strip on each winding change.

The control values for the triangles define the size of an index buffer. For example, the index buffer stores 1 bit for each triangle, and two additional bits for each triangle whose control bits are 0 (RESTART). The first triangle in any strip would always be a triangle with RESTART control bits, and therefore the first 3 bits for these triangles are always 1, and are not stored. As described in the foregoing, the index buffer is organized into is-first bits, wherein one is-first bit per vertex is indicative of whether a first index to a given vertex is encountered, and 'N' bits per index to store each non-first index to a vertex. The index buffer is compressed by re-ordering vertices by first use and omitting storage of the first index to every vertex, as identified using corresponding is-first bits. This enables calculating the first index of a given vertex, by simply using a counter, e.g., by counting the number of is-first bits that were encountered before processing the current vertex. In an example, a single is-first bit per index is used to indicate whether it is the first index to its corresponding vertex. In one implementation, vertices of a first triangle in a new strip will always be referenced for the first time, and therefore their corresponding is-first bits need not be stored. The non-first indices are directly stored in a packed buffer. An exemplary technique of encoding the index buffer is detailed with reference to FIG. 7.

Figure 7:
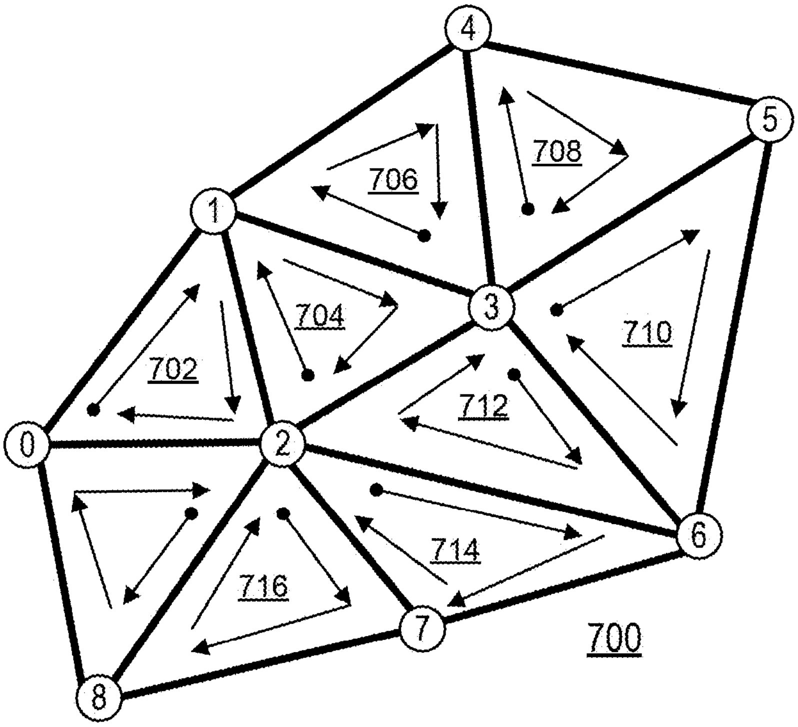
FIG. 7 is a block diagram illustrating generation of a compressed index buffer based on mesh topology data.

FIG. 7 is a block diagram illustrating generation of a compressed index buffer based on mesh topology data. Mesh topology is encoded using triangle strips, as detailed in FIG. 6. In one implementation, to encode mesh topology in a compressed manner, the order of the stored vertices is used to minimize the size of the mesh topology data. That is, instead of storing data each time a new vertex is referenced for the first time, the first reference is identified by means of a counter.

In one implementation, the length of the index buffer is determined by the contents of the control bits. The index buffer is further organized into two sections-a first index buffer including is-first bits, each indicating whether a given index is a first reference to a given vertex, and a non-first indices buffer. In one implementation, if an is-first bit indicates that the vertex has been referenced for the first time, corresponding vertex index is not stored and is computed by incrementing a counter. Further, the first three indices of vertices are always 'first references', and their corresponding is-first bits are not stored. In an implementation, the total size of the first-index buffer is lesser than or equal to 24 bytes. In one implementation, a triangle's position in the index buffer is computed by adding 2 bits to the triangle's index in the buffer, for each RESTART triangle (i.e., first triangle in a new strip) at the same or earlier positions. This gives the index buffer position for the triangle's third vertex. The remaining two vertices are inferred from the previous two triangles based on the control bits, as detailed below.

In the example shown in the figure, a new strip 700 is generated and the first triangle 702 in the strip is formed using the vertices 0, 1, and 2. In one implementation, subsequent triangles are then formed based either on EDGE 1 and EDGE 2 bits (bits 750). For instance, a second triangle 704 can be formed based on the EDGE 1 bits, i.e., using vertices 2, 1, and 3, and reusing the first edge (between vertices 2 and 1) of the first triangle 702. Further, a third triangle 706 can then be formed using the vertices 3, 1, and 4, and reusing the first edge (between vertices 3 and 1) of the second triangle 704. Continuing using bits 750, a fourth triangle 708 is formed using the vertices 3, 4, and 5 and reusing the second edge (between vertices 3 and 4) of the second triangle 704. Triangles 710-716 are formed similarly.

Based on the strip 700 created using the control values, the index buffer 760 for the strip 700 is generated that stores an index to each vertex of each created triangle. This can include first references and non-first references to each vertex. In this example, the strip buffer stores references to vertices 0-8, with vertices 0 and 2 being referenced more than once. In an implementation, to store these references, the index buffer 760 is divided into two sections—the is-first array 762 and the non-first array 764. In one implementation, the is-first array 762 stores first references of each vertex, i.e., each time a vertex is referenced for the first time in the strip 700, a corresponding bit is stored in the is-first array 762. In this example, the is-first array stores 9 bits, for vertices 0-8 that have been each referenced for the first time in the strip 700. Further, the non-first array 764 directly stores bits for non-first indices corresponding to vertices. In this example, the non-first array 764 stores bits for vertices 0 and 2 that have each been referenced more than once (twice each). As described earlier, a triangle's position in the index buffer is computed by adding 2 bits to the triangle's index in the buffer, for each RESTART triangle (i.e., first triangle in a new strip) at the same or earlier positions. This gives the index buffer position for the triangle's third vertex. The remaining two vertices are inferred from the previous two triangles based on the control bits, as detailed below. For example, to retrieve a third vertex of triangle 'I' (where I is a zero-based index), the index buffer is read at address A where A=2*R+I, and R is the number of RESTART bits at positions at or before I. Referring to the example in the figure, for the triangle 706 (formed using vertices 3,1,4), whose index is 2 (i.e., I=2), there is one preceding RESTART triangle (i.e., R=1), and therefore the result is 2*1+2=4.

An index from the compressed index buffer is extracted as follows:

```
uint get_index(uint indexPosition, uint64_t isFirst, uint nonFirstIndices[ ])
{
        // count number of 'first' vertex refs which precede this one
        int numFirst = 0;
        for (int i = 0; i < indexPosition; i++)
                {
                        if (isFirst & (1ull << i))
                        numFirst++;
                }
```

-continued

```
        // the first reference to each vertex is implicit
        // non-first references are read
        if (isFirst & (1ull << indexPosition)
            return numFirst;
        else
            return nonFirstIndices [indexPosition − numFirst]; // NOTE: Bounds check
omitted
        }
```

In one implementation, a primitive index for a triangle can be inferred from the triangle's position in the strip 700, thereby mitigating the need to directly store it. In an example, a 29 bit primitive index base is stored in a DGF block (e.g., block header), and is added to the triangle position (given by triangle index) to generate the primitive index. This is shown in the following exemplary sequence: [PrimitiveIndex=header.prim_id_base+triangle_index]. In one implementation, the result must be 29 bytes in size. In another implementation, a total number of vertices in the DGF block is given by the number of is-first bits. All index values encoded in the non-first indices buffer must be less than this total. If an out-of-range index is stored in the index buffer, all ray-triangle intersections against the affected triangles may result in misses.

Figure 8:
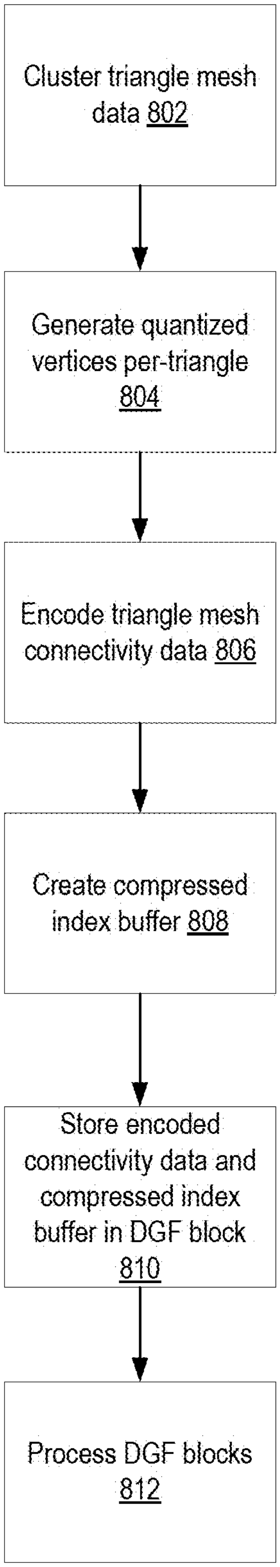
FIG. 8 illustrates a method for storing geometrical primitive data using fixed-size data blocks.

FIG. 8 illustrates a method for storing geometrical primitive data using fixed-size data blocks. In one implementation, primitives such as geometrical triangles included in triangle meshes are encoded and the encoded data is stored using data arrays of fixed-size data blocks (e.g., blocks of 128 bytes) to be directly consumed by a processing circuitry (e.g., GPU 205) for ray traversal or rasterization. In one or more implementations, the encoded data is generated in the form of a dense geometry format (DGF) data block (e.g., DGF block 500 shown in FIG. 5).

In an implementation, triangle mesh data is initially clustered using a surface area heuristic (SAH) clustering strategy (block 802) for optimal raytracing performance. Pre-clustering the geometry based on SAH accelerates the BVH build, since a BVH builder receives an efficient spatial partitioning, and does not need to construct the partitioning from the original, larger triangle set. In one implementation, vertices corresponding to each triangle in each cluster are encoded to generated quantized vertices per-triangle (block 804). In one example, data pertaining to vertices is defined using a 24 bit signed base position in the grid. A variable-width (e.g., 1-16 bits) unsigned offset for each vertex (relative to the base position) is also stored. Finally, a power-of-2 scale factor, used to map the quantization grid to floating-point coordinates for each triangle vertex, is stored as an IEEE biased exponent.

In one implementation, encoding mesh data further includes encoding data pertaining to triangle mesh connectivity, i.e., mesh topology data (block 806). According to the implementation, mesh topology data is encoded using triangle strips. For each triangle, two control bits are generated that indicate a position of the triangle relative to two previously stored triangles in the triangle strip. These values can be encoded based on whether a new strip needs to be initiated, whether a first edge of a previously stored triangle needs to be reused in an existing strip, whether a second edge of a previously stored triangle needs to be reused in an existing strip, or whether an opposite edge of a predecessor's predecessor triangle is to be reused in an existing strip.

Based on the content of the control values, a compressed index buffer is created (block 808). The compressed buffer is divided into two sections: a first array of "is-first" bits, and a second array to store non-first bits. The "is-first" bits include one bit per vertex reference, indicating whether it is a first reference to a given vertex. In one implementation, the first reference to a given vertex may be omitted from the compressed index buffer, and can be computed by incrementing a counter. The non-first references are stored using 'N' bits per index, wherein the value of N is predefined. In one implementation, the value of N is stored in the header of a corresponding DGF block.

The compressed index buffer along with the encoded mesh topology data is stored in the DGF block (block 810). The DGF block can further include an optional OMM palette, and an optional GeomID palette, as described in the foregoing. Further, multiple DGF blocks are processed by a processing circuitry (block 812), e.g., for dynamically loading and accessing geometric data into a software application or game during its execution or runtime. In one or more implementations, the described encoding mechanisms are aimed at improving geometry compression, and offers the advantages of storage of large models in a compact form, in a manner that allows for direct consumption by hardware. Further, compared to conventional techniques a substantial reduction in memory footprint, and a reduction in ray traversal time can be achieved. The described encoding can also enable in creating simpler preprocessing pipelines than available with traditional encoding means. Further, primitive data can be compressed using lossy compression with precise control over data loss, as well as sdirect rendering of the compressed data is possible.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:

circuitry configured to encode mesh data comprising a plurality of geometrical primitives, wherein to encode the mesh data the circuitry is configured to:

generate control values, wherein each control value is indicative of a position of a geometrical primitive relative to one or more other geometrical primitives;

generate an index buffer comprising a plurality of index bits, wherein each index bit indicates either a first reference or a non-first reference to a given vertex of the geometrical primitive; and store the encoded mesh data corresponding to the control values and the index buffer.

2. The apparatus as claimed in claim 1, wherein a length of the index buffer is determined based at least in part on a content of each of the control values.

3. The apparatus as claimed in claim 1, wherein the plurality of index bits at least in part comprise:

one bit per vertex of the geometrical primitive, wherein the bit indicates whether the given vertex is referenced for a first time; and a predefined number of bits to store each non-first reference of the given vertex, wherein a value of the predefined number.

4. The apparatus as claimed in claim 1, wherein an identifier corresponding to each geometrical primitive is computed by adding a predefined bit value to a value representing a position of the geometrical primitive in a primitive strip.

5. The apparatus as claimed in claim 1, wherein for each geometrical primitive, each of the control values comprise one of:

a first control value indicating initiation of a new primitive strip;

a second control value indicating reuse of a first edge of a predecessor geometrical primitive as an edge for a new geometrical primitive in an existing primitive strip;

a third control value indicating reuse of a second edge of the predecessor geometrical primitive as an edge for the new geometrical primitive in the existing primitive strip; and a fourth control value indicating reuse of an opposite edge of a predecessor's predecessor geometrical primitive as an edge for the new geometrical primitive.

6. The apparatus as claimed in claim 1, wherein to encode the mesh data, the circuitry is further configured to generate, for each vertex of a given geometrical primitive:

a fixed-bit base position per coordinate of the vertex in a three-dimensional space; and a variable-width offset for the vertex relative to the base position.

7. The apparatus as claimed in claim 6, wherein the circuitry is further configured to generate a power-of-two scale factor to map the fixed-bit base position per coordinate of each vertex to corresponding floating-point coordinates.

8. A method for encoding mesh data comprising a plurality of geometrical primitives, the method comprising:

generating, by processing circuitry, control values, wherein each control value is indicative of a position of a geometrical primitive relative to one or more previously stored geometrical primitives;

generating, by the processing circuitry, an index buffer comprising a plurality of index bits, wherein each index bit indicates either a first reference or a non-first reference to a given vertex of the geometrical primitive; and storing, by the processing circuitry, the encoded mesh data corresponding to the control values and the index buffer in a data block.

9. The method as claimed in claim 8, wherein a length of the index buffer is determined based at least in part on a content of each of the control values.

10. The method as claimed in claim 8, wherein the plurality of index bits at least in part comprise:

one bit per vertex of the geometrical primitive identifying whether the given vertex is referenced for a first time; and a predefined number of bits to store each non-first reference of the given vertex, wherein a value of the predefined number is stored in a header portion of the data block.

11. The method as claimed in claim 8, wherein an identifier corresponding to each geometrical primitive is computed by adding a predefined bit value to a value representing a position of the geometrical primitive in a primitive strip.

12. The method as claimed in claim 8, wherein for each geometrical primitive, the control values comprise one of:

a first control value indicating initiation of a new primitive strip;

a second control value indicating reuse of a first edge of a predecessor geometrical primitive as an edge for a new geometrical primitive in an existing primitive strip;

a third control value indicating reuse of a second edge of the predecessor geometrical primitive as an edge for the new geometrical primitive in the existing primitive strip; and a fourth control value indicating reuse of an opposite edge of a predecessor's predecessor geometrical primitive as an edge for the new geometrical primitive.

13. The method as claimed in claim 8, further comprising generating, by the processing circuitry, for each vertex of a given geometrical primitive:

a fixed-bit base position per coordinate of the vertex in a three-dimensional space; and a variable-width offset for the vertex relative to the base position.

14. The method as claimed in claim 13, further comprising generating a power-of-two scale factor to map the fixed-bit base-position coordinates of each vertex to corresponding floating-point coordinates.

15. A ray tracing system comprising:

a memory configured to store mesh data comprising a plurality of geometrical primitives; and encoding circuitry configured to:

retrieve the mesh data from the memory;

generate control values, wherein each control value is indicative of a position of a geometrical primitive relative to one or more previously stored geometrical primitives;

generate a compressed index buffer comprising a plurality of index bits, each index bit indicative of either a first reference or a non-first reference to a given vertex of the geometrical primitive; and store the control values and the compressed index buffer in a data block.

16. The ray tracing system as claimed in claim 15, wherein the plurality of index bits at least in part comprise:

one bit per vertex of the geometrical primitive identifying whether the given vertex is referenced for a first time; and a predefined number of bits to store each non-first reference of the given vertex, wherein a value of the predefined number is stored in a header portion of the data block.

17. The ray tracing system as claimed in claim 15, wherein an identifier corresponding to each geometrical primitive is computed by adding a predefined bit value to a value representing a position of the geometrical primitive in a primitive strip.

18. The ray tracing system as claimed in claim 15, wherein for each geometrical primitive, the control values comprise one of:

a first control value indicating initiation of a new primitive strip;

a second control value indicating reuse of a first edge of a predecessor geometrical primitive as an edge for a new geometrical primitive in an existing primitive strip;

a third control value indicating reuse of a second edge of the predecessor geometrical primitive as an edge for the new geometrical primitive in the existing primitive strip; and a fourth control value indicating reuse of an opposite edge of a predecessor's predecessor geometrical primitive as an edge for the new geometrical primitive.

19. The ray tracing system as claimed in claim 15, wherein to encode the mesh data, the encoding circuitry is further configured to generate, for each vertex of a given geometrical primitive:

a fixed-bit base position per coordinate of the vertex in a three-dimensional space; and a variable-width offset for the vertex relative to the base position.

20. The ray tracing system as claimed in claim 19, wherein the encoding circuitry is further configured to generate a power-of-two scale factor to map the fixed-bit base position coordinates of each vertex to corresponding floating-point coordinates.

* * * * *